(12) United States Patent
Wang et al.

(10) Patent No.: US 9,997,311 B2
(45) Date of Patent: Jun. 12, 2018

(54) MOTORIZED VACUUM CIRCUIT BREAKER ASSEMBLY

(71) Applicant: General Electric Company, Schenectady, NY (US)

(72) Inventors: Wei Wang, Shanghai (CN); Xuhui Ren, Shanghai (CN); Liying Li, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 223 days.

(21) Appl. No.: 14/350,697

(22) PCT Filed: Apr. 10, 2013

(86) PCT No.: PCT/CN2013/073999
§ 371 (c)(1),
(2) Date: Apr. 9, 2014

(87) PCT Pub. No.: WO2014/166075
PCT Pub. Date: Oct. 16, 2014

(65) Prior Publication Data
US 2016/0211096 A1 Jul. 21, 2016

(51) Int. Cl.
*H01H 33/50* (2006.01)
*H01H 3/30* (2006.01)
(Continued)

(52) U.S. Cl.
CPC .............. *H01H 33/50* (2013.01); *H01H 3/30* (2013.01); *H01H 3/56* (2013.01); *H01H 33/666* (2013.01);
(Continued)

(58) Field of Classification Search
CPC ........ H01H 3/56; H01H 33/666; H01H 33/50; H01H 3/30; H01H 2003/3063; H02B 11/127
See application file for complete search history.

(56) References Cited

U.S. PATENT DOCUMENTS 4,153,828 A  5/1979  Barkan
4,162,385 A  7/1979  Bould et al.
(Continued)

FOREIGN PATENT DOCUMENTS

CN   2076707 U   5/1991
CN   2609243     3/2004
(Continued)

OTHER PUBLICATIONS

"Advanced Design Vacuum Circuit Breakers", ADVAC technical guide, Issue Date: 2011.
(Continued)

*Primary Examiner* — Bernard Rojas
(74) *Attorney, Agent, or Firm* — GE Global Patent Operation; Stephen G. Midgley

(57) ABSTRACT

A vacuum circuit breaker (VCB) assembly includes a single motor configured to rotate at least one rotor, a VCB having a breaking mechanism configured to control current flow through the VCB and a first electromagnetic clutch configured to selectively engage the at least one rotor with the breaking mechanism to charge the breaking mechanism. The VCB assembly also includes an undercarriage configured to support the VCB assembly and to move the VCB assembly from a first position to a second position and a second electromagnetic clutch configured to selectively engage the at least one rotor with the undercarriage to drive the undercarriage.

14 Claims, 6 Drawing Sheets

(51) Int. Cl.
  *H02B 11/127* (2006.01)
  *H01H 3/56* (2006.01)
  *H01H 33/666* (2006.01)

(52) U.S. Cl.
  CPC ... *H02B 11/127* (2013.01); *H01H 2003/3063* (2013.01)

(56) References Cited

U.S. PATENT DOCUMENTS

| | | |
|---|---|---|
| 4,163,133 A | 7/1979 | Bould |
| 5,280,258 A | 1/1994 | Opperthauser |
| 5,628,394 A | 5/1997 | Benke et al. |
| 6,354,161 B1 | 3/2002 | Patel |
| 6,373,358 B1 | 4/2002 | Davies et al. |
| 7,186,937 B1 | 3/2007 | Ricciuti et al. |
| 2011/0147172 A1* | 6/2011 | Kim ............ H02B 11/133 200/50.21 |
| 2016/0156164 A1* | 6/2016 | Yang ............ H01H 33/46 200/50.24 |

FOREIGN PATENT DOCUMENTS

| | | |
|---|---|---|
| CN | 102723676 | 10/2012 |
| EP | 2317529 A1 | 5/2011 |
| EP | 2453539 | 5/2012 |
| JP | H10-80013 | 3/1998 |

OTHER PUBLICATIONS

International Search Report and Written Opinion dated Jan. 23, 2014 which was issued in connection with PCT Patent Application No. PCT/CN2013/073999 which was filed on Apr. 10, 2013.

Unofficial English translation of Chinese Search Report from corresponding CN Application No. 201380003435.5 dated Aug. 3, 2015.

* cited by examiner

MOTORIZED VACUUM CIRCUIT BREAKER ASSEMBLY

BACKGROUND OF THE INVENTION

The subject matter disclosed herein relates to a motorized vacuum circuit breaker (VCB) assembly, and in particular to a VCB assembly that physically charges a breaking mechanism and drives an undercarriage with the same motor.

Vacuum circuit breakers (VCB) are used to interrupt voltages or supplies of power, typically in medium voltage systems up to approximately 40 kilovolts. In VCBs, metal contacts are enclosed in a container that forms a vacuum. When the circuit breaker trips and the contacts separate to open the power circuit, the vacuum separating the contacts results in minimal arcing between the contacts.

VCBs may be stored in storage structures including switchgear structures which may provide access to the VCBs. However, the various components of the storage structures including motors, gears, electronics, VCBs and other components may result in large storage structures.

BRIEF DESCRIPTION OF THE INVENTION

According to one aspect of the invention, a vacuum circuit breaker (VCB) assembly includes a single motor configured to rotate at least one rotor. The VCB assembly also includes an undercarriage configured to support the VCB and to move the VCB from a first position to a second position, and a first electromagnetic clutch configured to selectively engage with the at least one rotor and to drive the undercarriage in response to a rotation of the rotor. The VCB assembly also includes a VCB having a breaking mechanism configured to control current flow through the VCB and a second electromagnetic clutch configured to selectively engage with the at least one rotor with the breaking mechanism and to charge the breaking mechanism in response to a rotation of the rotor.

According to another aspect of the invention, a switchgear apparatus includes one or more compartments. Each compartment includes a vacuum circuit breaker (VCB) assembly having an undercarriage assembly, and each VCB assembly includes a single motor configured to rotate at least one rotor. Each VCB assembly also includes a first electromagnetic clutch configured to selectively engage with the at least one rotor and to move the undercarriage from an enclosed position to an access position in response to a rotation of the rotor. Each VCB assembly also includes a VCB having a breaking mechanism to control current flow through the VCB. Each breaking mechanism also includes a second electromagnetic clutch configured to selectively engage with the at least one rotor and with the breaking mechanism to charge the breaking mechanism.

According to yet another aspect of the invention, a method of controlling a vacuum circuit breaker (VCB) assembly includes rotating at least one rotor with a single motor and engaging a second electromagnetic clutch with the at least one rotor. The method includes transferring torque from a second electromagnetic clutch to a breaking mechanism to control current flow through the VCB. The method also includes engaging a second electromagnetic clutch with the at least one rotor. The method includes transferring torque from the first electromagnetic clutch to an undercarriage to move the undercarriage from a first position to a second position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
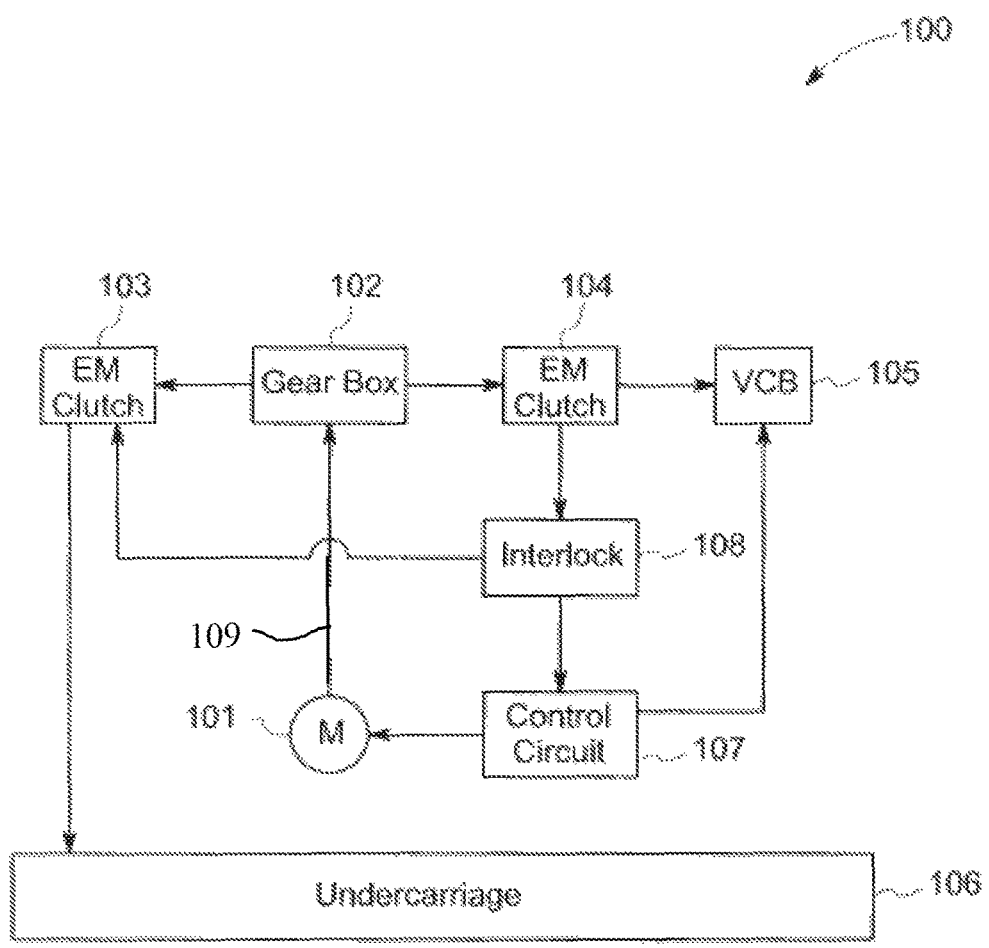
FIG. 1 is a vacuum circuit breaker assembly according to an embodiment of the invention.
Figure 5:
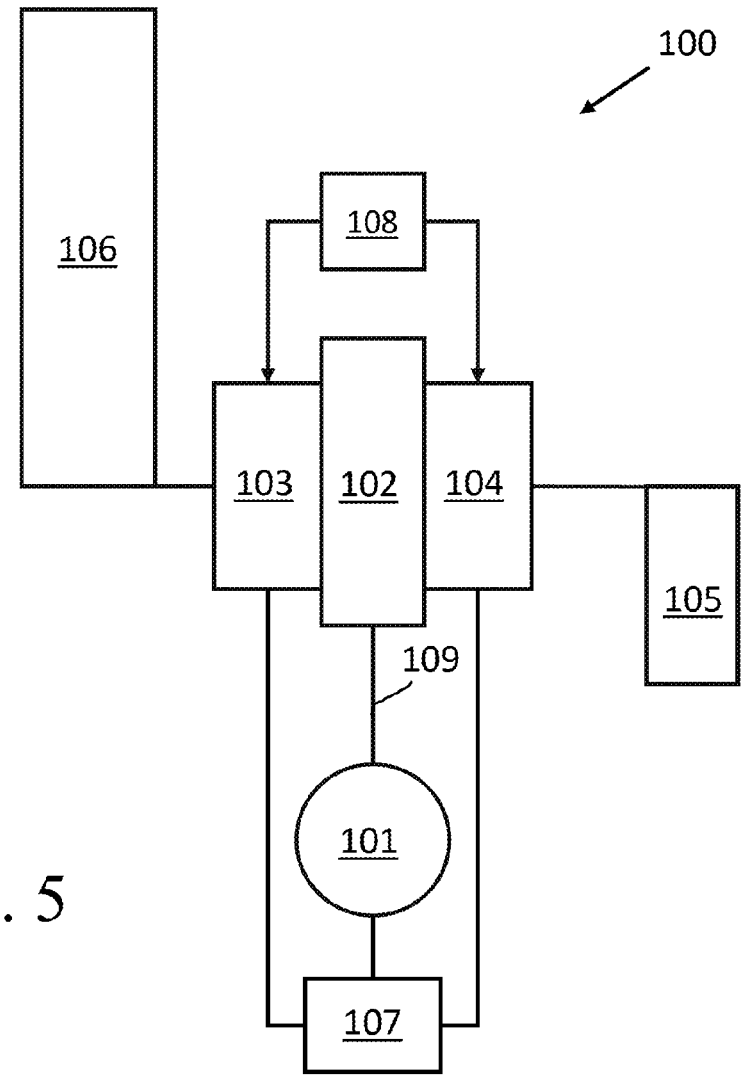
FIG. 5 is a schematic diagram of vacuum circuit breaker assembly according to an embodiment of the invention.
Figure 6:
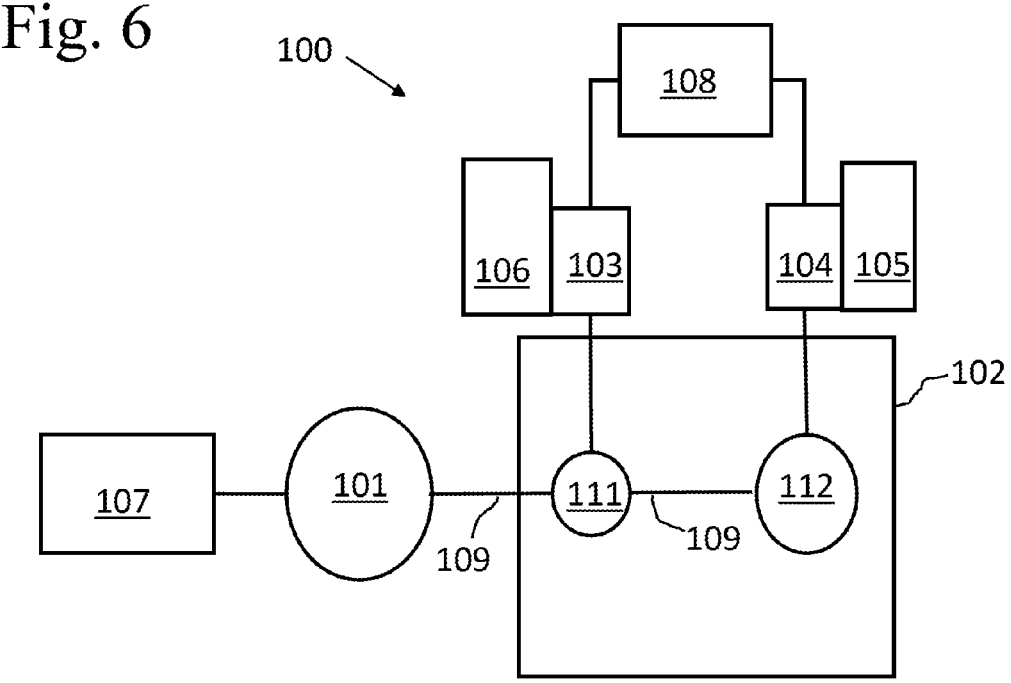
FIG. 6 is another schematic view of vacuum circuit breaker assembly according to an embodiment of the invention; and The detailed description explains embodiments of the invention, together with advantages and features, by way of example with reference to the drawings.

FIGS. 1 and 5-6 illustrate a vacuum circuit breaker (VCB) assembly 100 according to embodiments of the invention in schematic format. The VCB assembly 100 includes a motor 101, a gear box 102 driven by the motor 101 and a first electromagnetic clutch 103 and a second electromagnetic clutch 104 that are each selectively driven by the gear box 102. The assembly 100 includes a VCB 105 configured to receive an electrical power input and transmit the electrical power to an output. The VCB 105 includes one or more breaking mechanisms configured to open the power circuit to prevent power output based on a predetermined level of voltage or current being received at the VCB 105, or based on user input to manually open the power circuit. In one embodiment, the one or more breaking mechanisms include a spring, coil or other actuator connected to electrical contacts that pass electrical current of an electrical circuit. The breaking mechanism is set or "charged" by applying a force to the breaking mechanism to store potential energy in the breaking mechanism, such as by compressing a spring. A latch is used to secure the breaking mechanism. When a break condition is detected, such as an over-current or a user input to interrupt the electrical circuit, the latch is removed and the breaking mechanism is discharged to quickly separate contacts of the vacuum circuit breaker 105 to open an electrical circuit.

Figure 2A:
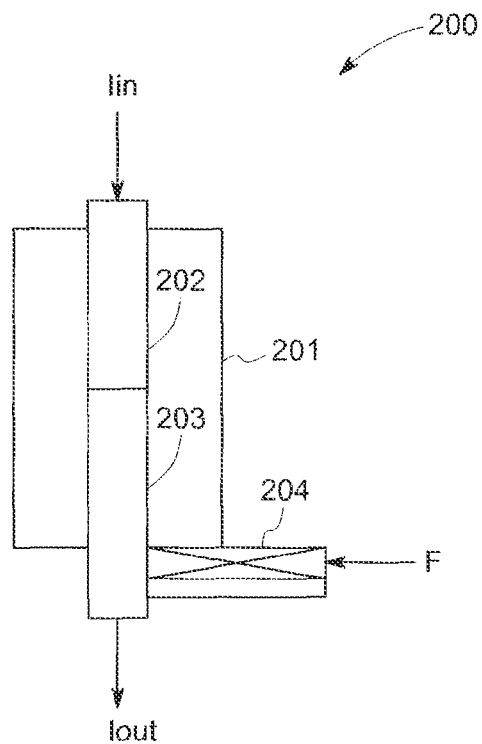
FIGS. 2A and 2B illustrate a block diagram of a vacuum circuit breaker according to an embodiment of the invention.
Figure 2B:
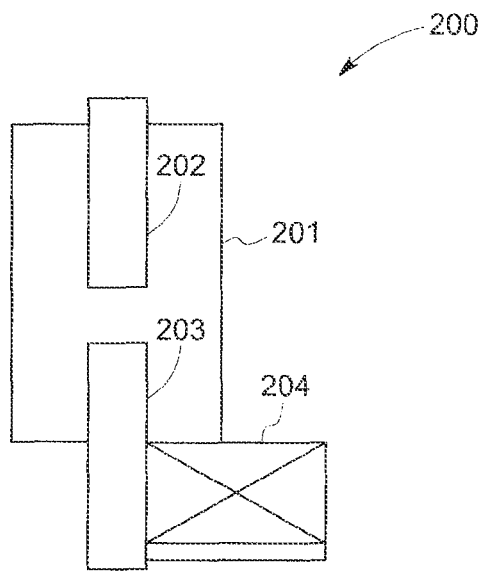

FIGS. 2A and 2B illustrate a block diagram of a vacuum circuit breaker (VCB) 200 according to an embodiment of the invention. The VCB 200 may correspond to the VCB 105 of FIG. 1. In addition, while a block diagram of the VCB 200 is provided by way of description, embodiments of the invention encompass any type of vacuum circuit breaker including additional and different components.

Referring to FIG. 2A, the vacuum circuit breaker (VCB) 200 includes a vacuum container 201, a fixed contact 202 and a movable contact 203. The VCB 200 also includes a breaking mechanism 204, such as a spring. When a force F is applied to the breaking mechanism 204, the breaking mechanism 204 is charged, such as by compressing a spring. When the breaking mechanism 204 is charged, the moveable contact 203 engages the fixed contact 202 and current flows from one to the other. In FIG. 2A, current $I_{in}$ is illustrated as flowing into the fixed contact 202 and current $I_{out}$ is illustrated as flowing out from the movable contact 203.

Referring to FIG. 2B, when a breaking event, trigger or other circuit interruption event is detected, such as an over-voltage, over-current or user input to open the electrical circuit, the breaking mechanism 204 is discharged and the moveable contact 203 is separated from the fixed contact 202, preventing current flow in the electrical circuit. For example, in an embodiment in which the breaking mechanism 204 is a spring, a latch or other retaining mechanism may be removed from the spring causing the spring to uncoil and releasing potential energy as kinetic energy. The uncoiling of the spring causes the moveable contact 203 to quickly separate from the fixed contact 202.

Referring again to FIGS. 1 and 5-6, each of the first and second electromagnetic clutches 103 and 104 includes a rotor 109 and an armature (not shown). The rotor 109 is connected to the gear box 102 and rotates based on the rotation generated by the motor 101. The armature is disengaged from the rotor 109 until a current is applied to an electromagnetic coil on one of the rotor 109 and the armature to engage the rotor 109 with the armature. For example, in one embodiment, the rotor 109 includes a disk that faces the armature, the disk includes a magnetic component, and the armature includes a coil. When a current is passed through the coil, a magnetic field is generated which attracts the magnetic component. Accordingly, the armature and the rotor 109 engage each other, and the armature begins to rotate together with the rotor 109. Accordingly, rotation of the armature is selectively controlled with a control current to an electromagnetic device. The armature is connected to one or more devices that are to be driven or moved in response to the rotation of the rotor 109.

Referring to FIGS. 1 and 5-6, an armature of the first electromagnetic clutch 103 is connected to the undercarriage 106 and an armature of the second electromagnetic clutch 104 is connected to the VCB 105. In particular, the undercarriage 106 includes one or more gears, belts or other driving mechanisms to move the undercarriage from a first position, such as an enclosed position in a structure, to a second position, such as an access position to permit users to access components of the VCB assembly 100. The armature of the first electromagnetic clutch 103 engages the gears, belts or other driving mechanisms of the undercarriage 106 to physically drive the undercarriage 106 from one position to another. The first electromagnetic clutch 103 is connected via belts, gears, chains or other torque transferring mechanisms to the undercarriage 106. In one embodiment, the undercarriage 106 is a structure that supports each of the components of the VCB assembly 100. In other words, each of the motor 101, first and second electromagnetic clutches 103 and 104, gear box 102 and vacuum circuit breaker 105 may rest on the undercarriage 106 and may be supported by the undercarriage 106. In one embodiment, the undercarriage 106 is stored in an enclosing structure, such as a switchgear structure, during normal operation. Then, when a user or operator wishes to access the components of the VCB assembly 100, the torque may be transferred to the undercarriage 106 from the motor 101 via the gear box 102 and the first electromagnetic clutch 103 to cause the VCB assembly 100 to move outward from the enclosing structure to permit access to the components of the VCB assembly 100. When the undercarriage 106 is moved, each of the components of the VCB assembly 100 that are supported by the undercarriage 106 are also moved.

The motor 101 may also drive one or more components of the vacuum circuit breaker 105 via the gear box 102 and the second electromagnetic clutch 104. The vacuum circuit breaker 105 includes one or more breaking mechanisms connected to electrical contacts that control current flow in an electrical circuit. The second electromagnetic clutch 104 engages the one or more breaking mechanisms to charge the breaking mechanisms. For example, the armature of the electromagnetic clutch 104 may drive a compression arm that exerts a force against a spring to charge the spring. A latch engages the spring to maintain the spring in a charged state until a breaking event is detected. Embodiments of the invention encompass providing physical force, e.g. linear force, torque or both, to any component of the VCB 105, including arms, triggers, springs and any other components. Embodiments of the invention also encompass the generation of electrical power by the torque generated by the electromagnetic clutch 104 to electrically charge one or more components of the VCB 105 or electrical circuitry associated with the VCB 105.

The VCB assembly 100 also includes an interlock 108 to prevent harm to components or operators. The interlock 108 may include any type of interlock, such as an electrical interlock or a mechanical interlock, and may prevent the simultaneous engagement of the first and second electromagnetic clutches 103 and 104. In particular, while the second electromagnetic clutch 104 supplies power to the VCB 105, the interlock 108 prevents the supply of power to the first electromagnetic clutch 103 to cause the first electromagnetic clutch 103 to engage the gear box 102. Similarly, when a control signal is received to activate the first electromagnetic clutch 103 to engage the gear box 102, the interlock 108 ensures that power is stopped to the second electromagnetic clutch 104, preventing the second electromagnetic clutch 104 from engaging the gear box 102 and supplying torque to the VCB 105.

In operation, the motor 101 rotates at a speed determined by a control circuit 107, which may include any circuitry for driving a motor 101, such as pulse width modulation circuitry, pre-programmed signals, user-controlled signals based on analog dials or based on switches, or any other circuitry for driving the motor 101. The first and second electromagnetic clutches 103 and 104 exist in either an engaged state or a disengaged state according to commands received from the control circuit 107. During start-up or during normal operation, the control circuit 107 may transmit control signals to engage the second electromagnetic clutch 104 with the gear box 102 to charge components of the VCB 105 to maintain the VCB in the closed state, permitting electrical power to pass through the VCB 105. In one embodiment, for example, the motor 101, via the gear box 102 and second electromagnetic clutch 104, causes an armature or spring to rotate into a charged position. In the charged position, the armature or spring may be latched into place, and the second electromagnetic clutch 104 may be disengaged from the gear box 102.

In another embodiment, the second electromagnetic clutch 104 is maintained in an engaged position with the gear box 102 during operation of the VCB 105 to permit electrical power flow through the VCB 105. In such an embodiment, the second electromagnetic clutch 104 may provide a constant torque to an armature or spring, and the applied torque may be halted or overcome when a circuit break threshold is reached, or when another tripping event is detected, in the VCB 105.

The control circuit 107 may generate a control signal to engage the first electromagnetic clutch 103 to the gear box 102 based on a circuit break condition in the VCB 105, based on a user control, based on pre-programmed code or based on any other predetermined condition. In addition, a user may actuate a physical input, such as a button or switch to engage the first electromagnetic clutch 103 to the gear box 102. When the first electromagnetic clutch 103 is engaged to the gear box 102, the torque generated by the motor 101 is transmitted to the undercarriage 106 via the gear box 102 and the first electromagnetic clutch 103. The motor 101 drives one or more gears, wheels, levers or other mechanisms to move the undercarriage 106 from one position or location to another position or location. In particular, when the undercarriage 106 is located in a storage structure, the motor 101 moves the undercarriage 106 to protrude outward from the storage container to permit an operator to access the components of the VCB assembly 100.

In one embodiment, the gear box 102 includes first and second gears 111, 112 having different rotation rates. The first electromagnetic clutch 103 engages the first gear 111, or a rotor 109 connected to the first gear 111, to drive the undercarriage 106 at a first rate, and the second electromagnetic clutch 104 engages the second gear 112, or a rotor 109 connected to the second gear 112, to drive a breaking mechanism of the VCB 105 at a second rate different than the first rate. In such an embodiment, the breaking mechanism of the VCB 105 and the undercarriage 106 are driven at different rates even when the motor 101 rotates a shaft or rotor 109 at a single constant rate.

In another embodiment, a level of power supplied to the motor 101 is varied based on whether the motor 101 is engaged with the first electromagnetic clutch 103 or the second electromagnetic clutch 104 to vary the rate of rotation or torque applied to the breaking mechanism and the undercarriage 106. In yet another embodiment, the gear box 102 includes the first and second gears having different rotation rates to engage the first and second electromagnetic clutches 103 and 104, and the level of power supplied to the motor 101 is varied based on whether the motor 101 is engaged with the first electromagnetic clutch or the second electromagnetic clutch 104.

Figure 3:
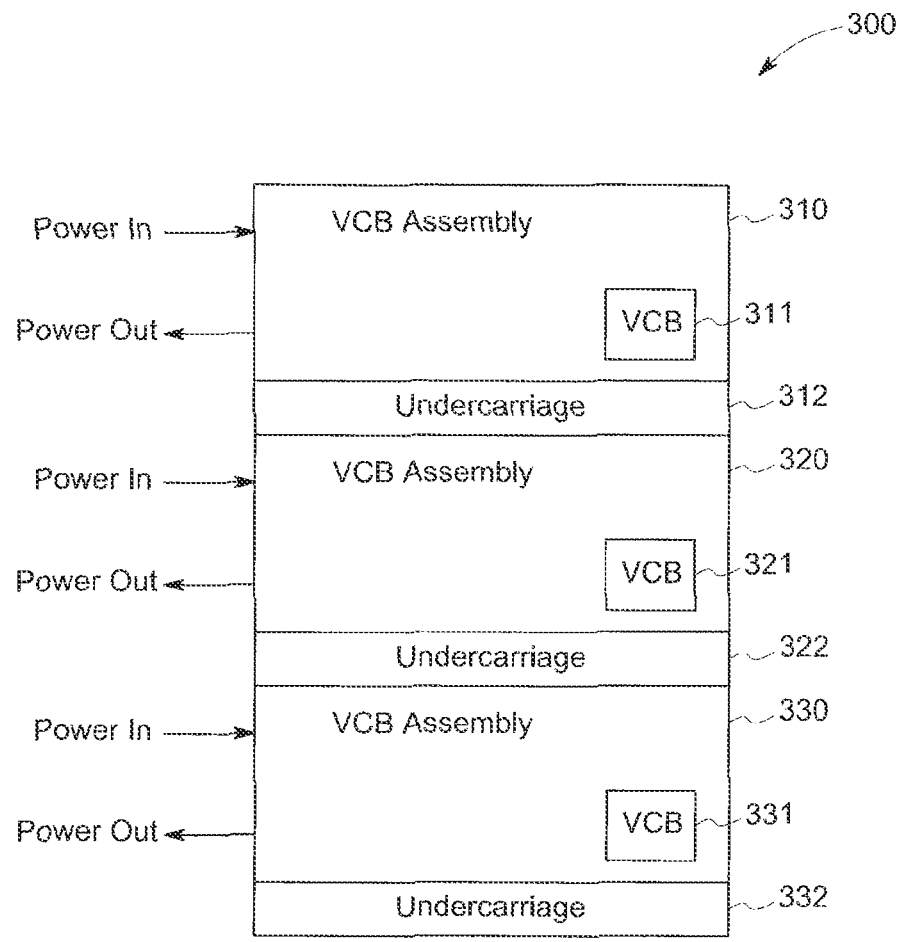
FIG. 3 is a switchgear apparatus according to an embodiment of the invention.

FIG. 3 illustrates a switchgear apparatus 300 according to an embodiment of the invention. The switchgear apparatus 300 includes three vacuum circuit breaker (VCB) assemblies 310, 320 and 330 stacked one on top of the other. However, embodiments of the present invention are not limited to switchgear assemblies including any particular number of VCB assemblies. Instead, any number of VCB assemblies physically supportable by the switchgear apparatus 300 may be used. Each one of the VCB assemblies 310, 320 and 330 may correspond to the VCB assembly 100 of FIG. 1. Each VCB assembly 310, 320 and 330 includes a VCB 311, 321 and 331 and an undercarriage 312, 322 and 332. Each of the undercarriages 312, 322 and 332 moves its respective VCB assembly 310, 320 and 330 independent of each other VCB assembly 310, 320 and 330, allowing an operator to view the components of each VCB assembly 310, 320 and 330 separately.

Each VCB assembly 310, 320 and 330 receives power input and outputs power. The power input is passed through the VCBs 311, 321 and 331, respectively, and the VCBs 311, 321 and 331 interrupt the flow of power based on voltage or current levels that exceed predetermined thresholds. In embodiments of the present invention, each of the VCB assemblies 310, 320 and 330 includes a separate motor, gear box, and a pair of electromagnetic clutches, as illustrated in the VCB assembly 100 of FIG. 1, to independently control the respective VCBs 311, 321 and 331 and undercarriages 312, 322 and 332.

Figure 4:
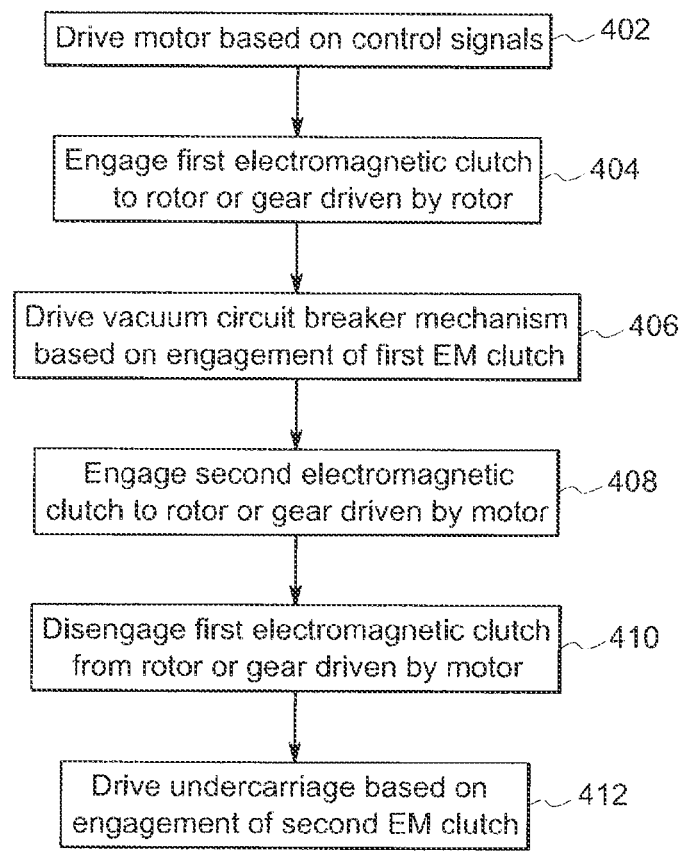
FIG. 4 is a flow chart illustrating a method according to an embodiment of the invention.

FIG. 4 illustrates a flowchart of a method according to an embodiment of the invention. In block 402, a motor is driven based on control signals. The motor may include any type of motor capable of generating torque in a shaft or a rotor. In block 404, a first electromagnetic (EM) clutch is engaged to a rotor or gear that is driven by the motor. In one embodiment, an electromagnetic coil on a rotor or armature is energized to cause the rotor to engage an armature of the first electromagnetic clutch. The rotor is driven by the motor, which causes the armature to be driven by the motor when the first electromagnetic clutch is engaged with the rotor.

In block 406, a vacuum circuit breaker (VCB) mechanism is driven based on the engagement of the first electromagnetic clutch with the rotor or gear driven by the motor. The breaking mechanism may be a spring, actuator or any other mechanism capable of being charged to operate the VCB. In block 408, a second electromagnetic (EM) clutch is engaged to a gear or rotor driven by the motor. The gear or rotor may be the same gear or rotor that drives the first electromagnetic clutch or a different gear or rotor. For example, in one embodiment, the motor drives gears of a gear box, and the first and second electromagnetic clutches engage different gears or rotors of the gear box corresponding to different turn directions or gear ratios. However, in each embodiment of the invention, the first and second electromagnetic clutches are both driven by the same motor.

In block 410, the first electromagnetic clutch is disengaged from the gear or rotor based on the second electromagnetic clutch being engaged with the gear or rotor. In one embodiment, control signals are supplied to the first electromagnetic clutch to disengage prior to engaging the second electromagnetic clutch. In another embodiment, an electrical interlock prevents the first and second electromagnetic clutches from simultaneously engaging the gear or rotor. In such an embodiment, if simultaneous signals exist to engage both of the electromagnetic clutches, the electrical interlock may include hardware or software to select only one of the electromagnetic clutches to remain engaged to the gear or rotor.

In block 412, an undercarriage is driven based on the engagement of the second electromagnetic clutch with the gear or rotor. Driving the undercarriage may include moving the undercarriage between an access position and a storage position.

According to embodiments of the invention, one motor may drive both an undercarriage and a breaking mechanism by using two electromagnetic clutches. Accordingly, components of VCB assemblies and switchgear assemblies may be controlled electronically, such as in a smart grid. In addition, a size of a VCB assembly or switchgear device may be reduced by reducing a number of motors needed to drive components of the VCB assembly or switchgear apparatus.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A vacuum circuit breaker (VCB) assembly, comprising:
a single motor configured to selectively rotate at least one rotor;
a VCB having a breaking mechanism to control current flow therethrough, the breaking mechanism selectively chargeable from discharged state to a charged state;
an undercarriage configured to support the VCB assembly, the undercarriage selectively movable between a first position and a second position to thereby move the VCB assembly from the first position to the second position; and
a first electromagnetic clutch in mechanical communication with the undercarriage, the first electromechanical clutch configured to selectively engage the at least one rotor to move the undercarriage between the first position and the second position in response to rotation the at least one rotor;
a second electromagnetic clutch in mechanical communication with the breaking mechanism, the second electromechanical clutch configured to selectively engage the at least one rotor to charge the breaking mechanism from discharged state to a charged state in response to rotation of the at least one rotor.

2. The VCB assembly of claim 1, wherein the at least one rotor is connected to each of the first electromagnetic clutch and the second electromagnetic clutch.

3. The VCB assembly of claim 1, further comprising:
an interlock connected to the first electromagnetic clutch and the second electromagnetic clutch to disengage the first electromagnetic clutch from the at least one rotor based on the second electromagnetic clutch engaging the at least one rotor.

4. The VCB assembly of claim 3, wherein the interlock is an electrical interlock configured to detect an electrical signal for the second electromagnetic clutch to engage the at least one rotor with the undercarriage, and configured to stop a signal to the first electromagnetic clutch to engage the at least one rotor with the breaking mechanism based on detecting the electrical signal for the second electromagnetic clutch.

5. The VCB assembly of claim 1, wherein the single motor and the first and second magnetic clutches are all located on the undercarriage and are moved together when the undercarriage moves.

6. The VCB assembly of claim 1, further comprising:
a control circuit configured to control a rotation of the motor and an engagement of the first and second electromagnetic clutches with the at least one rotor.

7. The VCB assembly of claim 1, further comprising:
a gear box having a first gear with a first rotation rate and a second gear with a second rotation rate different from the first rotation rate,
wherein the at least one rotor includes a first rotor connected to the first gear and a second rotor connected to the second gear, the first rotor configured to selectively engage the breaking mechanism and the second rotor configured to selectively engage the undercarriage.

8. A switchgear apparatus, comprising:
one or more compartments, at least one compartment comprising a vacuum circuit breaker (VCB) assembly, each VCB assembly comprising:
a single motor configured to selectively rotate at least one rotor;
a VCB having a breaking mechanism to control electrical power flow therethrough, the breaking mechanism selectively chargeable from discharged state to a charged state;
an undercarriage selectively moveable between an enclosed position to an access position;
a first electromagnetic clutch in mechanical communication with the undercarriage, the first electromechanical clutch configured to selectively engage the at least one rotor to move the undercarriage between the enclosed position and the access position in response to rotation of the at least one rotor; and
a second electromagnetic clutch in mechanical communication with the breaking mechanism, the second electromechanical clutch configured to selectively engage the at least one rotor to charge the breaking mechanism from discharged state to a charged state in response to rotation the at least one rotor.

9. The switchgear apparatus of claim 8, wherein the at least one rotor is configured to selectively engage each of the first electromagnetic clutch and the second electromagnetic clutch.

10. The switchgear apparatus of claim 8, further comprising:
an interlock connected to the first electromagnetic clutch and the second electromagnetic clutch to disengage the first electromagnetic clutch from the at least one rotor based on the second electromagnetic clutch being engaged by the at least one rotor.

11. The switchgear apparatus of claim 10, wherein the interlock is an electrical interlock configured to detect an electrical signal for the second electromagnetic clutch to drive the undercarriage, and configured to stop a signal to the first electromagnetic clutch to charge the breaking mechanism based on detecting the electrical signal for the second electromagnetic clutch.

12. The switchgear apparatus of claim 8, wherein the single motor and the first and second magnetic clutches are all located on the undercarriage and are moved together when the undercarriage moves.

13. The switchgear apparatus of claim 8, further comprising:
a control circuit configured to control a rotation of the motor and an engagement of the first and second electromagnetic clutches with the at least one rotor.

14. A method of controlling a vacuum circuit breaker (VCB) assembly, comprising:
rotating at least one rotor with a single motor;
engaging the at least one rotor with a first electromagnetic clutch;
transferring torque from the first electromagnetic clutch to a breaking mechanism of a vacuum circuit breaker to charge the breaking mechanism; and
engaging the at least one rotor with a second electromagnetic clutch;
transferring torque from the second electromagnetic clutch to an undercarriage to move the undercarriage from a first position to a second position.

* * * * *